(12) United States Patent
Bolzoni et al.

(10) Patent No.: US 11,643,098 B1
(45) Date of Patent: May 9, 2023

(54) GEOLOCATION-BASED VEHICLE OPERATION

(71) Applicant: DEM Technologies LLC, Los Angeles, CA (US)

(72) Inventors: Damiano Bolzoni, Los Angeles, CA (US); Marco Canevese, Venice (IT)

(73) Assignee: DEM TECHNOLOGIES LLC, Los Angeles, CA (US)

( * ) Notice: Subject to any disclaimer, the term of this patent is extended or adjusted under 35 U.S.C. 154(b) by 0 days.

(21) Appl. No.: 17/884,494

(22) Filed: Aug. 9, 2022

(51) Int. Cl.
*B60W 50/04* (2006.01)
*B60W 50/00* (2006.01)
*G07C 5/00* (2006.01)
*G07C 5/08* (2006.01)

(52) U.S. Cl.
CPC ........... *B60W 50/045* (2013.01); *G07C 5/008* (2013.01); *G07C 5/0841* (2013.01); *B60W 2050/0095* (2013.01); *B60W 2050/046* (2013.01)

(58) Field of Classification Search
None
See application file for complete search history.

(56) References Cited

U.S. PATENT DOCUMENTS

| 8,634,980 B1 * | 1/2014 | Urmson | G05D 1/0212 701/23 |
| 2020/0282791 A1 * | 9/2020 | Lalwani | B60G 17/018 |

FOREIGN PATENT DOCUMENTS

CN 112757859 A * 5/2021

* cited by examiner

*Primary Examiner* — Abdhesh K Jha
(74) *Attorney, Agent, or Firm* — Womble Bond Dickinson (US) LLP

(57) ABSTRACT

Embodiments of the present disclosure provide geolocation based operation of a vehicle by generating a configuration profile for one or more geolocations along a particular route. For each of a plurality of trips a vehicle takes along a route, a set of sensors may be polled at regular intervals as the vehicle travels along the route to obtain vehicle trip data at each interval. The vehicle trip data obtained at each interval may be associated with a geolocation of the vehicle at the interval. For each of the one or more geolocations of the vehicle along the route, a corresponding configuration profile may be generated based on the vehicle trip data associated with the geolocation across the plurality of trips to generate a set of configuration profiles, wherein each of the set of configuration profiles comprises instructions to modify a configuration setting of one or more components of the vehicle.

30 Claims, 7 Drawing Sheets

GEOLOCATION-BASED VEHICLE OPERATION

FIELD

The disclosed embodiments relate generally to geolocation-specific vehicle operation based on route-specific vehicle trip data monitored over time.

BACKGROUND

Vehicles may have multiple sensor systems that can observe their surroundings and allow for control of various components of the vehicle in real time. This requires a considerable amount of continuous data gathering and processing in order to make split-second decisions that are often required during a trip. In addition, certain data may be relevant to certain vehicle types and/or certain routes but not other vehicle types and/or other routes.

Due to the computationally intensive nature of the continuous data gathering and processing required for such real time control of vehicle components, many vehicles have sophisticated electronics and sensors integrated which can enhance the driving experience. Such technology allows for monitoring of a vehicle's surroundings at various locations during a trip, the dynamics of the vehicle at various locations during the trip, information about the route the vehicle is taking on the trip, and geolocation data for each of the various locations during the trip among other data.

BRIEF DESCRIPTION OF THE DRAWINGS

The appended drawings illustrate examples and are, therefore, exemplary embodiments and not considered to be limiting in scope.

DETAILED DESCRIPTION

Figure 1A:
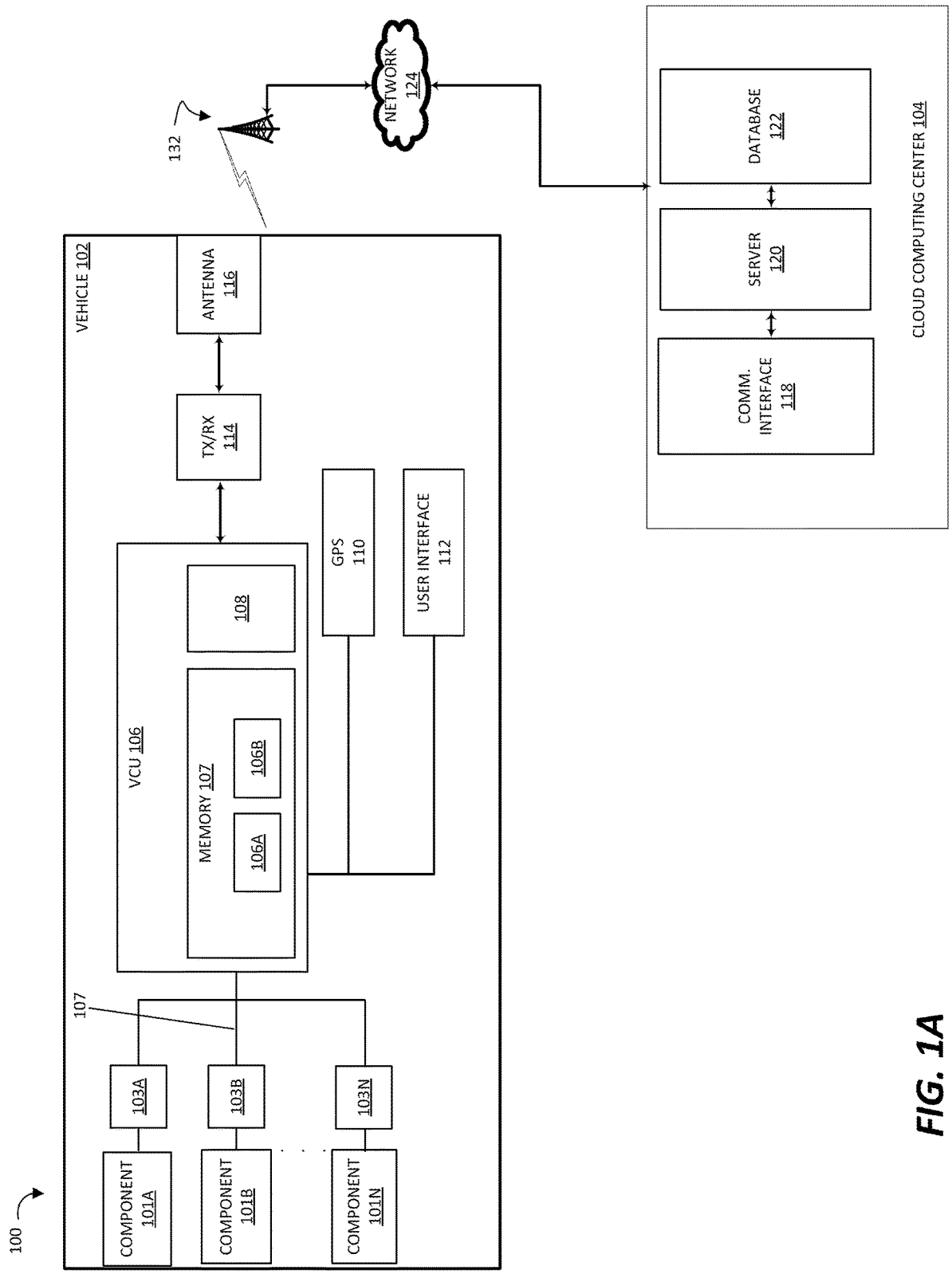
FIG. 1A is a block diagram of a system, in accordance with some embodiments of the present disclosure.

Embodiments of the present disclosure provide geolocation based operation of a vehicle by generating a configuration profile(s) for one or more geolocations along a particular route, each configuration profile having instructions to modify the functioning/configuration of one or more components of the vehicle. More specifically, for each of a plurality of trips a vehicle takes along a route, a processing device may poll a set of sensors at regular intervals as the vehicle travels along the route to obtain vehicle trip data at each interval. The processing device may associate the vehicle trip data obtained at each interval with a geolocation of the vehicle at the interval. For one or more geolocations of the vehicle along the route, generating a corresponding configuration profile based on the vehicle trip data associated with the geolocation across the plurality of trips to generate a set of configuration profiles, wherein each of the set of configuration profiles comprises instructions to modify a configuration setting of one or more components of the vehicle.

FIG. 1 illustrates an embodiment of a system 100 for automated geolocation-based vehicle control based on vehicle trip data monitored over time. System 100 includes a vehicle 102 communicatively coupled a cloud computing center 104. In the context of this application, "communicatively coupled" means coupled in such a way that data can be exchanged, in one or both directions, between two entities or components. Although only one vehicle 102 is shown, in other embodiments there need not be a one-to-one correspondence between vehicles and cloud computing center 104. For example, cloud computing center 104—which can, for instance, be set up and run by a vehicle manufacturer or third party service provider—can be communicatively coupled to multiple vehicles from that manufacturer, up to and including the entire fleet of that manufacturer's vehicles.

Vehicle 102 includes a plurality of components 101a-n, each having a sensor 103a-n coupled to it. The plurality of components 101a-n may include one or more of e.g., a powertrain (e.g., an electric motor(s) and/or an engine), a steering wheel, an accelerator pedal, a brake pedal, a suspension, rear and side mirrors, a compass (or other appropriate direction finding apparatus), tires/wheels, active aerodynamic components (e.g., rear spoiler, side or rear wings, underbody wings etc.), a battery pack(s), and a gear box, among others. Although each component 101 of FIG. 1 is illustrated as having/being coupled to a corresponding sensor 103, there need not be a one-to-one correspondence between sensors 103 and components 101 and any of the sensors 103 (including any of the sensors mentioned below) may not be coupled to a component 101, but may be stand-alone sensors that monitor some aspect of vehicle trip data as described in further detail herein.

The plurality of sensors 103a-n may include one or more of e.g., powertrain sensor(s) (e.g., to measure powertrain output and/or rotations per time unit), a steering wheel angle/position sensor, a suspension sensor (e.g., to measure suspension settings such as the distance between the road and key points in the suspension), a traction control sensor, an altitude sensor, a gyroscope, an accelerometer, a brake pedal position sensor, an accelerator pedal position sensor, a battery pack charge and temperature sensor(s), an ambient temperature sensor(s) (e.g., to measure powertrain temperature), an outside temperature sensor, a humidity sensor, a rain sensor, a light sensor, an inertial measurement unit (IMU) sensor, a LIDAR system, a radar system, one or more cameras, temperature sensors, a torque sensor, and a tire pressure monitor among others, as discussed in further detail herein. As the vehicle 102 drives along a route, the sensors 103 may measure vehicle trip data (hereinafter referred to as VTD). VTD may include information regarding the motion/dynamics of the vehicle 102, information regarding components of the vehicle 102 (including performance/functioning of such components), and information regarding the surrounding environment of the vehicle, among other types of information. The VTD may include a variety of different components including direction, altitude, a timestamp, speed/velocity, accelerator and brake pedal position, steering wheel angle and position, front and rear brake oil pressure, current powertrain output and/or rotations per time unit (for each powertrain on board), amount of regenerative braking/energy recovered therefrom (if the vehicle 102 is electric or is equipped with electric motors), battery pack(s) charge and temperature (if the vehicle 102 is electric or is equipped with electric motors), tire pressure, ambient temperature, wheel speed, wheel angle (for each wheel), suspension settings (including height), lifter settings (if the vehicle 102 is equipped with a lifter), orientation and angular velocity including lateral G force (measured via the gyroscope and accelerometer), outside temperature/temperature of the environment the vehicle is driving through, the humidity of the environment the vehicle is driving through, an amount of rain detected, an amount of light detected (e.g., daylight) and a driving mode selected by the driver (if the vehicle 102 is equipped with multiple driving modes), among others. It should be noted that in some embodiments, certain components of the above-mentioned VTD can be obtained by the VCU 106 communicating directly with a particular component(s) 101 (e.g., via an ECU (not shown) of the particular component) instead of via a sensor 103. For example, one component of the VTD may be an amount of regenerative braking applied by the electric motor and the VCU 106 may directly poll the electric motor to determine this. Thus, references herein to the VCU 106 polling the set of sensors 103 to obtain VTD may be interpreted as including obtaining certain components of the VTD directly from a corresponding component 101.

Each component 101 may be communicatively coupled, via a controller area network (CAN) bus 107, to the vehicle control unit (VCU) 106 and one or more components 101 may be coupled to a respective sensor 103a-n via the CAN bus 107. VCU 106 is in turn communicatively coupled to a global positioning system (GPS) unit 110, a user interface 112, and a transceiver 114. Although described with respect to a CAN bus, any appropriate bus protocol may be used. The transceiver 114 is communicatively coupled to an antenna 116, through which vehicle 102 can wirelessly transmit data to, and receive data from, a cloud computing center 104. In the illustrated embodiment, vehicle 102 communicates wirelessly via antenna 116 with a tower 132, which can then communicate via network 124 with cloud computing center 104.

The vehicle control unit (VCU) 106 may be a controller including a memory 107, a processing device 108, and a communication interface (not shown) with which it can communicate with components 101, sensors 103, GPS 110, user interface 112, and transceiver 114. In some embodiments, the VCU 106 is the vehicle 102's main computer, but in other embodiments it can be a component separate from the vehicle's main or primary computer. Similarly, the GPS 110 may be implemented on-board the vehicle 102 or may be implemented on a mobile computing device (e.g., a smart phone) that is connected to the vehicle. For some embodiments, VCU 106 may be decentralized and implemented as multiple controllers that each manage a separate task. For example, one controller may manage the functions of the chassis, including for example vehicle dynamics sensors and actuators for brakes among others. Another controller may manage the functions of the power-train, including for example controlling acceleration, de-acceleration, energy regeneration commands, comfort braking, and battery charging among others. The functions of VCU 106 described herein may be distributed across one or more of these multiple controllers. The memory 107 may include a trip-specific vehicle dynamics monitoring module 106A and a configuration profile generation module 106B, which the VCU 106 may execute to perform the functions described herein.

Cloud computing center 104 includes a communication interface 118, a server 120 and one or more databases 122. Communication interface 118 is communicatively coupled to server 120 and to network 124 so that cloud computing center 104 can exchange data with vehicle 102 through network 124. Although illustrated as a single server, in other embodiments server 120 can include multiple servers, each of which includes one or more microprocessors, memory, and storage.

Although embodiments of the present disclosure are described with respect to the trip-specific vehicle dynamics monitoring module 106A and the configuration profile generation module 106B being executed using the on-board hardware of vehicle 102 on its own, this is not a limitation. In some embodiments, either or both of the trip-specific vehicle dynamics monitoring module 106A and the configuration profile generation module 106B may be executed on the cloud computing center 104. Such embodiments can be advantageous because the computational complexity and massive data storage associated with monitoring, storing, and analyzing a vehicle's dynamic data on a geolocation-specific basis may be better implemented using cloud resources of the cloud computing center 104 instead of the vehicle 102's own VCU and other onboard computational resources (thereby saving onboard computational resources of the vehicle 102). In addition, because the VTD (sourced from various sensors 103) can be gathered in the cloud, it can be continuously updated and analyzed along with the VTD of other drivers. In some embodiments, a hybrid approach is contemplated where some functions (e.g., the trip-specific vehicle dynamics monitoring module 106A) may be implemented on board the vehicle 102, while other functions (e.g., the configuration profile generation module 106B as well as storage of VTD and configuration profiles (discussed in further detail herein)) are performed by the cloud computing center 104.

Figure 1B:
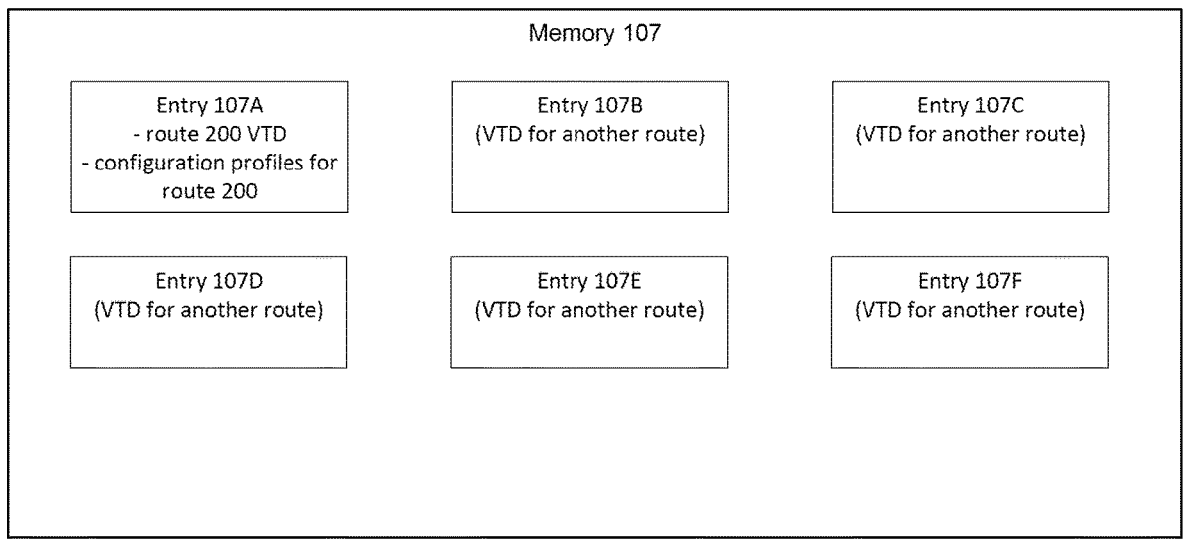
FIG. 1B illustrates a memory with a set of entries for vehicle trip data of different routes, in accordance with some embodiments of the present disclosure.

When the vehicle 102 travels to a destination for the first time (i.e., a new destination), the route may be logged by the GPS system 110 during transit and upon reaching the destination, the VCU 106 may create a new entry in memory 107 (as shown in FIG. 1B) where the new route and any associated VTD may be stored. In some embodiments, the driver may input the new destination into the GPS system 110, which may pre-calculate the route to the destination, and the VCU 106 may store the pre-calculated route in a new entry in memory 107 and update the entry with VTD as it is gathered during the trip. As the vehicle 102 travels towards the new destination, the VCU 106 (executing the trip-specific vehicle dynamics monitoring module 106A) may continuously poll the sensors 103 (or a subset thereof) to collect VTD. Each time VTD is obtained from the sensors 103 along the route, it may be associated with the geolocation along the route at which it was obtained (determined by the GPS 110) and all VTD collected during the route may be added to the entry in memory 107 for the new route.

The VCU 106 may collect VTD at intervals (time-based or distance-based intervals) and the VTD collection intervals can be dynamically changed by the vehicle 102 under certain circumstances (e.g., if speed is greater than X, then the data collection interval may be halved). In some embodiments, either the manufacturer and/or driver of the vehicle 102 can change the VTD collection intervals (e.g., manually or remotely). In addition, the vehicle dynamics monitoring module 106A may provide the driver of the vehicle 102 with the ability to specify a subset of the sensors 103 that the VCU 106 will poll when obtaining VTD. The driver may specify a custom subset of sensors 103 to poll, or may select from a number of preset options as discussed in further detail herein. For example, the driver may select a preset option corresponding to a type of vehicle (e.g., electric), which may be associated with a subset of sensors 103 that are relevant for electric vehicles (e.g., a subset that includes battery pack sensors and electric motor output sensors).

Figure 2:
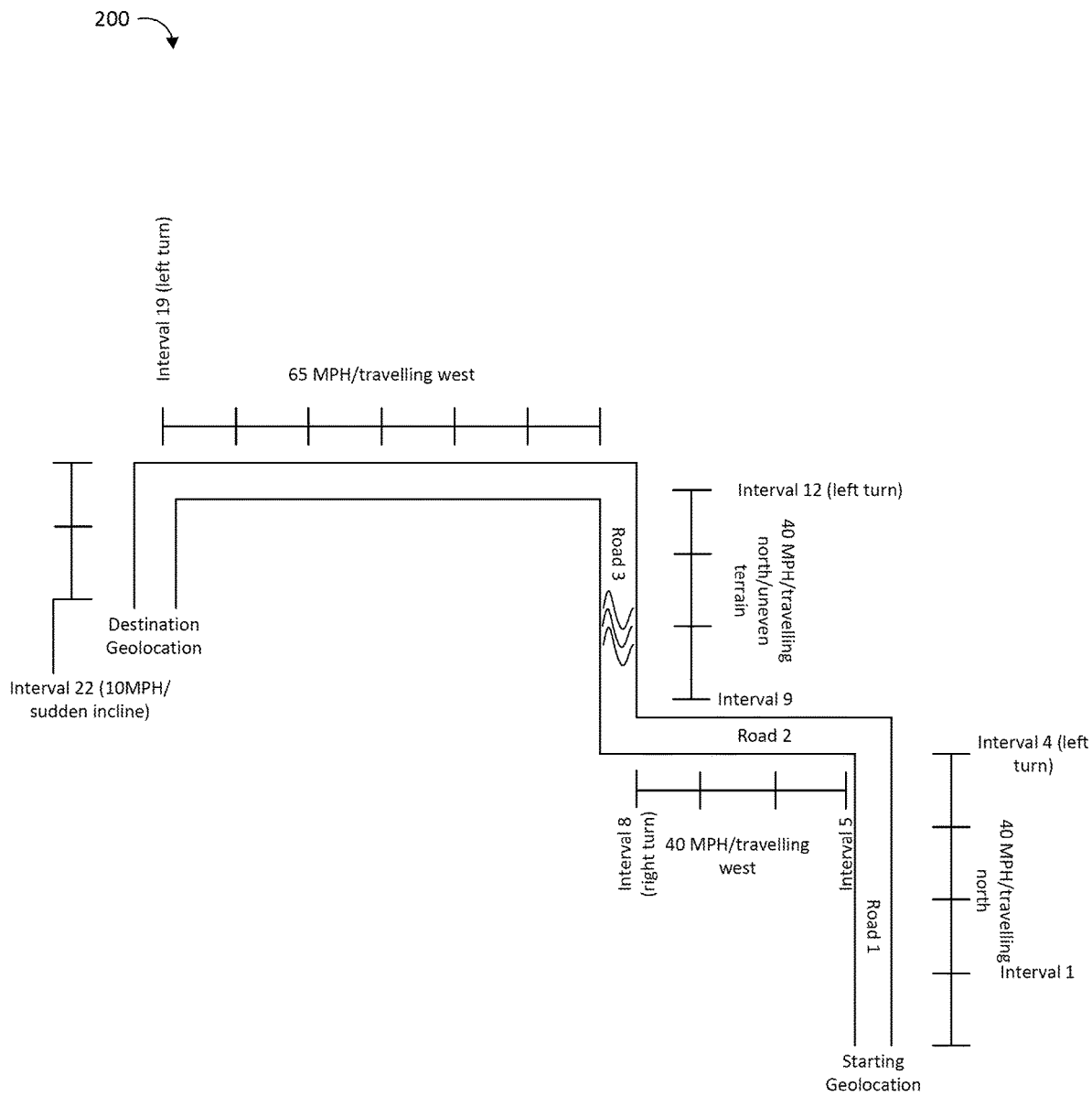
FIG. 2 illustrates the monitoring and collection of vehicle trip data along a route, in accordance with some embodiments of the present disclosure.

FIG. 2 illustrates an example route 200 from a start geolocation to a destination geolocation. As the vehicle 102 travels the route 200 from the start geolocation to the destination geolocation, the VCU 106 may poll each of the sensors 103 or a subset of the sensors 103 (as discussed herein) at regular intervals to obtain VTD at those regular intervals. The example of FIG. 2 may be described with the VCU 106 polling a subset of sensors 103 that includes the direction sensor (compass), powertrain sensor, velocity sensor, suspension sensor, steering wheel angle/position sensor, brake and accelerator pedal sensors, the battery pack charge sensor, and a lateral G sensor (comprising e.g., a gyroscope and accelerometer). Although the example of FIG. 2 is discussed with respect to time-based intervals (3 second intervals), this is not a limitation and the intervals at which the VCU 106 polls the subset of sensors 103 may be time-based intervals (e.g., every 3 seconds) or distance-based intervals (e.g., every 5 meters). Each time VTD is received from the subset of sensors 103, the VCU 106 may associate the VTD for that interval with the geolocation it was gathered from (as determined by the GPS system 110).

The vehicle 102 may begin its trip on route 200 by traveling north on road 1 at 40 miles per hour (MPH). At interval 1, the VCU 106 may poll the subset of sensors 103 to determine VTD at interval 1 that includes the speed at which vehicle 102 is traveling (40 MPH), the direction of travel (north), suspension data (height, distance between the ground and key points of the suspension), steering wheel angle/position, brake pedal position and accelerator pedal position (to determine stiffness of each pedal as well as the amount of braking/acceleration occurring at interval 1—if any), the lateral Gs (zero at interval 1), and the amount of charge left. The VCU 106 may associate the interval 1 VTD with the geolocation at which the vehicle was at during interval 1 (referred to as geolocation 1—determined by the GPS system 110). At interval 2 the VCU 106 may poll the subset of sensors 103 and obtain similar VTD as at interval 1, and associate this interval 2 VTD with geolocation 2. At interval 3 the VCU 106 may poll the subset of sensors 103 and obtain similar VTD as at interval 1, and associate this interval 3 VTD with geolocation 3.

At interval 4, the vehicle 102 may make a left turn onto road 2, and as it does so the VCU 106 may poll the subset of sensors 103 to determine VTD at interval 4. The VTD at interval 4 may indicate that the vehicle 102 has slowed to 15 MPH, the direction of travel (north-west), the angle/position of the steering wheel at interval 4 (while making the left turn), the brake pedal position (which may indicate the amount of braking applied to slow the vehicle 102 down to 15 MPH—the speed at which the vehicle 102 took the left turn), the accelerator pedal position, the battery charge, the lateral Gs (indicating the lateral acceleration of the vehicle 102 as it is turning left—e.g., 1G), and suspension data at interval 4 (while making the left turn). The VCU 106 may associate this interval 4 VTD with geolocation 4.

It should be noted that FIG. 2 illustrates the VCU 106 as polling the subset of sensors 103 every 3 seconds for ease of description and illustration, however this is not a limitation and the VCU 106 can poll the subset of sensors/obtain VTD at more frequent intervals to provide more fine grained control. For example, by increasing the polling frequency, the VCU 106 may obtain VTD between intervals 3 and 4 (when the vehicle 102 is beginning its turn) and obtain VTD between intervals 4 and 5 (when the vehicle 102 is coming out of its turn), thereby providing the ability to generate additional configuration profiles dedicated to performing the left turn onto road 2 at geolocation 4 to obtain more fine grained control, as discussed in further detail herein.

Continuing the example of FIG. 2, after turning at interval 4, the vehicle 102 may at interval 5 poll the subset of sensors 103 again to determine VTD at interval 5. The VTD at interval 5 may indicate that the vehicle 102 is now travelling west at 40 MPH, suspension data, the angle/position of the steering wheel at interval 5, the brake pedal position, the accelerator pedal position, the lateral Gs (zero at interval 5) and the battery charge. The VCU 106 may associate the interval 5 VTD with geolocation 5. The VCU 106 may poll the subset of sensors 103 at intervals 6 and 7 and obtain similar VTD as at interval 5 and associate the VTD at intervals 6 and 7 with geolocations 6 and 7 respectively.

At interval 8, the vehicle 102 may make a right turn onto road 3, and as it does so the VCU 106 may poll the subset of sensors 103 to determine VTD at interval 8. The VTD at interval 8 may indicate that the vehicle 102 has slowed to 15 MPH, the brake pedal position at interval 8 (indicating the amount of braking applied to slow the vehicle 102 down to 15 MPH—the speed at which the vehicle 102 took the right turn), the accelerator pedal position at interval 8, the direction of travel (north-west), the angle/position of the steering wheel while making the right turn at interval 8, suspension data, battery charge, and lateral Gs (e.g., 1G) while making the right turn at interval 8. The VCU 106 may associate this interval 8 VTD with geolocation 8.

After turning at interval 8, the vehicle 102 may at interval 9 poll the subset of sensors 103 again to determine VTD at interval 9. The VTD at interval 9 may indicate that the vehicle 102 is now travelling at north at 40 MPH, suspension data, the angle/position of the steering wheel, the brake pedal position, the accelerator pedal position, the battery charge, and the lateral Gs. The suspension data of the VTD at interval 9 may indicate that road 3 is uneven and/or bumpy as discussed in further detail herein. The VCU 106 may associate the interval 9 VTD with geolocation 9. The VCU 106 may poll the subset of sensors 103 at intervals 10 and 11 and obtain similar VTD as at interval 9 and associate the VTD at intervals 10 and 11 with geolocations 10 and 11 respectively.

As the vehicle 102 continues on route 200, the VCU 106 may continue polling the subset of sensors 103 at each interval 12-22 to obtain VTD at each interval 12-22 and associate the VTD at each interval 12-22 with the corresponding geolocation 12-22 respectively. Upon reaching the destination geolocation, the VCU 106 may create a new entry 107A in memory 107 for route 200 and store the VTD gathered at each interval 1-22 in the entry 107A for route 200.

Over time, as the vehicle 102 travels the route 200 numerous times (i.e., takes numerous trips on route 200), VTD may be gathered as discussed above with respect to FIG. 2 for each trip on route 200 and stored in the corresponding entry 107A in the memory 107 (shown in FIG. 1B). The VCU 106 may perform this monitoring and gathering of VTD as discussed above for a variety of different routes, each route having a corresponding entry in the memory 107 (shown in FIG. 1B). Once the VCU 106 has gathered VTD for a route a threshold number of times (where the threshold number of times is one or multiple times), it may execute the configuration profile generation module 106B in order to generate a set of configuration profiles based on the VTD gathered from each trip on the route.

Each configuration profile may comprise a set of instructions for adjusting the configuration settings of one or more components 101 of the vehicle at or near a corresponding geolocation so as to change the vehicle dynamics when the vehicle reaches or approaches the corresponding geolocation. Examples of components 101 that configuration profiles could be applied to may include but are not limited to: the power train(s) (configuration settings for e.g., power output, rotations per time unit, temperature, regenerative braking settings for electric motors), the chassis, the dynamic engine/motor/battery pack mounts, suspension systems (configuration settings for e.g., stiffness or height of selected/all suspensions), active aerodynamic components (configuration settings for e.g., rear spoiler angle/height, side or rear wing angle, underbody wing angle etc.), battery pack(s) (configuration settings for e.g., current output or temperature), steering wheel (configuration settings for e.g. steering wheel angle, stiffness, reaction time), accelerator and brake pedals (configuration settings for e.g., stiffness, reaction time), gearbox (configuration settings for e.g., shifting time, available gears), and driving mode, among others.

Each configuration profile may be generated based on VTD gathered at the corresponding geolocation along the route 200 and the corresponding geolocation itself. The instructions of a configuration profile may specify the vehicle component(s) 101 for which the configuration settings are going to be changed and the new configuration setting value for each of the specified vehicle component(s) 101. The instructions of a configuration profile may also specify a required amount of time over which the new configuration settings for one or more of the components 101 must be enabled, a spatial distance over which the new configuration settings for one or more of the components 101 must be enabled (e.g., X seconds, X distance, etc.), and/or a set of disabling conditions dictating certain events that must occur or conditions that must be satisfied before the new configuration settings for one or more of the components 101 must be disabled. The disabling conditions may be used in situations where new configuration settings are not meant to be disabled within a particular time or after a certain distance, but upon the occurrence of an event or condition. For example, a disabling condition may specify a particular geolocation which must be reached before certain new configuration settings will be deactivated, and may include a direction that the vehicle 102 must be in upon reaching the particular geolocation before the certain new configuration settings will be deactivated. In another example, a disabling condition may specify that certain new configuration settings will remain active until the next power cycle of the vehicle. For example, the vehicle 102 may repeatedly travel on a route that goes through a city, wherein the power train of the vehicle 102 reduces its output by 50% while it is in the city. Thus, the VCU 106 may generate a configuration profile with new settings for the power train that reduce its output by 50% and may include in the configuration profile a disabling condition indicating that the power train output reduction setting will remain in effect until the vehicle 102 leaves the city or until the next power cycle (e.g., the driver stops and turn the vehicle off). In some scenarios, the disabling conditions may specify conditions under which certain new configuration settings are always to be active.

A configuration profile may further include additional parameters related to the VTD collected at the associated geolocation that could prevent any of the enumerated configuration settings from being implemented (e.g., "if tire pressure below X psi, configuration setting A" will not apply, or "if driving mode is Y, configuration setting B will not apply"). In some embodiments, the required amount of time or spatial distance over which the new configuration settings for each component 101 must be enabled may be calculated in terms of VTD collection intervals (as discussed in further detail below).

When determining the vehicle component(s) 101 for which the configuration settings are going to be changed, the new configuration setting value for each of the specified vehicle component(s) 101, and the required time interval or spatial distance over which the new configuration settings for each component 101 must be enabled, the VCU 106 may analyze the VTD collected at the corresponding geolocation for which the configuration profile is being generated. The VCU 106 may determine some of the vehicle component(s) 101 and corresponding configuration settings etc. directly from the VTD as discussed in further detail herein. However, the VCU 106 may also determine other vehicle component(s) 101 and corresponding configuration settings etc. by comparing certain components of the VTD to a corresponding threshold, as discussed in further detail herein.

Before any configuration profiles are generated, the VCU 106 may validate the VTD on a geolocation by geolocation basis. Thus, the VCU 106 may analyze the VTD for a particular geolocation from each of the multiple trips on route 200, and validate the VTD for consistency by determining whether the VTD for that particular geolocation in entry 107A meets a consistency threshold (i.e., the geolocation 1 VTD from each trip along route 200 are all sufficiently similar to each other). As part of this, the VCU 106 may also determine whether the geolocation data for a particular geolocation from each of the multiple trips on route 200 meets a consistency threshold. Each component of the VTD for route 200 as well as the geolocation may have a specific consistency threshold which may not require exact matches and may be tuned as appropriate. For example, geolocation consistency for data validation could include nearby geolocations which do not share exact coordinates. In some embodiments, the VCU 106 may use directional data from the VTD to assist in validating the geolocation data. For example, the VCU 106 may determine whether a direction (as determined by the compass) of the vehicle 102 associated with the geolocation data for a particular geolocation from each of the multiple trips is the same or within a similarity threshold. In addition to or alternatively, the VCU 106 may determine whether an incline or decline (as determined by e.g., the gyroscope) of the vehicle 102 associated with the geolocation data for a particular geolocation from each of the multiple trips is the same or within a similarity threshold.

The VTD for route 200 can be validated with data from multiple trips from the same driver or different drivers in scenarios where the vehicle 200 and the vehicles of other drivers are enabled to exchange data online via the cloud computing center 104 and the cloud computing center 104 can consolidate several trips along the same route. In some embodiments where the vehicle 102 does not upload VTD for route 200 online or analyze it on-board, VTD for route 200 could be analyzed by e.g., the manufacturer whenever the vehicle 102 is e.g., being serviced. If data is validated for consistency by the vehicle without uploading those, methods and algorithms for such validation be updated either remotely or during service.

Figure 3:
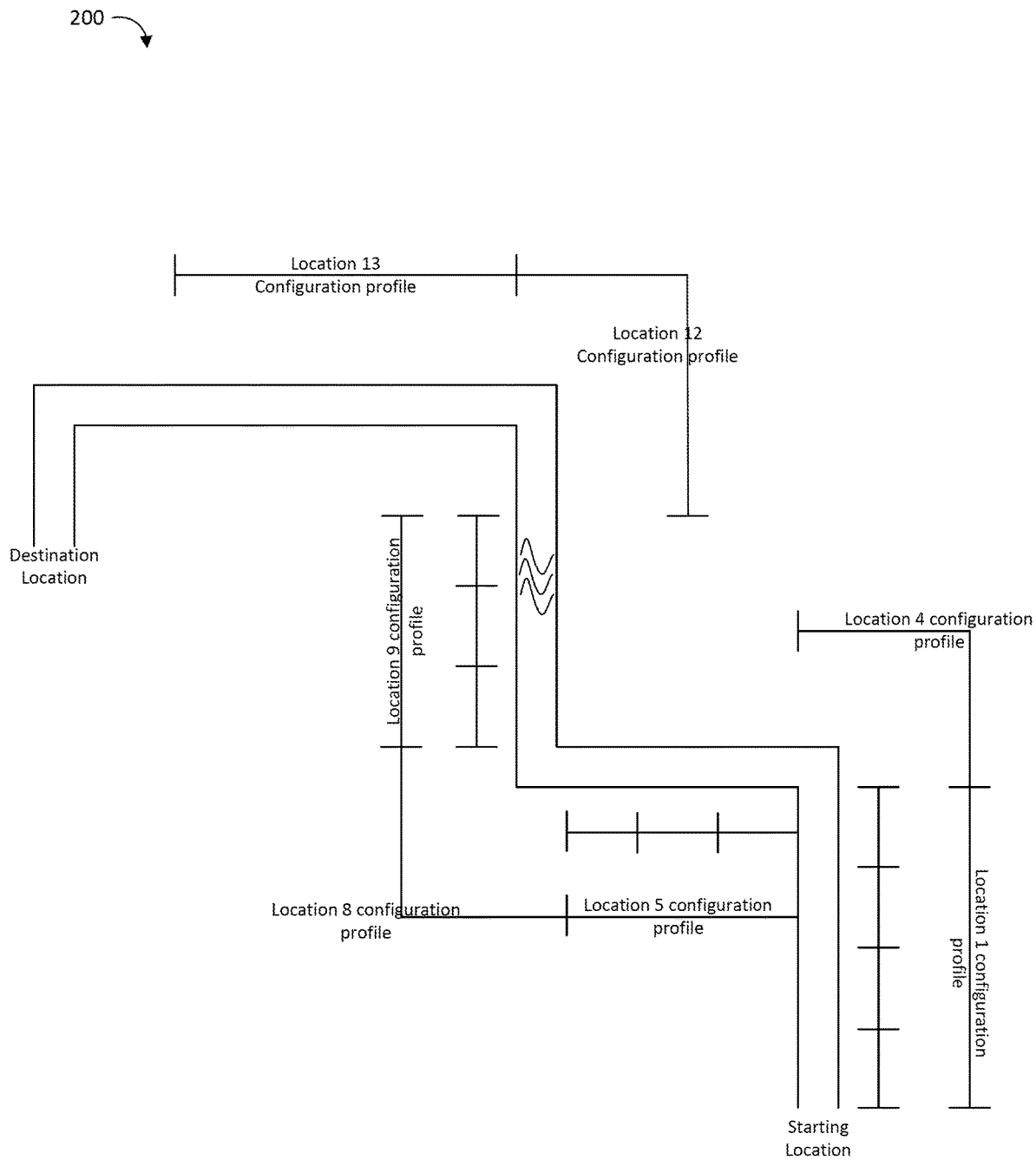
FIG. 3 illustrates the generation of configuration profiles for various geolocations along a route, in accordance with some embodiments of the present disclosure.

FIG. 3 illustrates the generation of a set of configuration profiles from the VTD gathered from the multiple trips along route 200. The VCU 106 (executing module 106B) may analyze the geolocation 1 (interval 1) VTD from each of the multiple trips on route 200, and upon validating the geolocation 1 VTD, may create a geolocation 1 configuration profile for route 200 comprising instructions for adjusting a configuration setting of one or more components 101 of vehicle 102 at geolocation 1. For example, the VCU 106 may analyze the various components of the geolocation 1 VTD, including the speed and direction components, the steering wheel angle/position, the position of the brake/accelerator pedals, the suspension data, lateral Gs, and battery charge, and determine that vehicle 102 should be traveling north at 40 MPH at geolocation 1, and may thus generate instructions to automatically adjust powertrain output power and steering wheel angle/position to do so when the vehicle 102 reaches or approaches geolocation 1. The VCU 106 may also compare one or more of the components of the geolocation 1 VTD to a corresponding threshold to determine any configuration settings for additional components 101. For example, the VCU 106 may compare the suspension data at geolocation 1 to a threshold distance between the ground and the suspension, and determine that the distance between the ground and the suspension at geolocation 1 is adequate and that no adjustment of the configuration setting of the suspension is needed. The VCU 106 may calculate the required amount of time (or distance) the geolocation 1 configuration profile will apply based on the speed of the vehicle 102 and the position of the steering wheel as well as VTD from a previous geolocation as well as a subsequent geolocation. In some embodiments, the required amount of time the configuration profile may be active may be based on the time intervals at which the VTD was collected (if the VTD collection intervals are time-based), while a distance the configuration profile may be active may be based on the distance intervals at which the VTD was collected (if the VTD collection intervals are time-based), or any other appropriate metric. Thus for example, the VCU 106 may determine that the geolocation 1 configuration profile may be active for 1 interval (i.e., 3 seconds, or until interval 2).

VCU 106 may then analyze the geolocation 2 (interval 2) VTD from each of the multiple trips on route 200, and upon validating the geolocation 2 VTD, may compare the geolocation 2 VTD to the geolocation 1 VTD to determine whether a new configuration profile must be created or if the configuration profile for geolocation 1 can be applied to geolocation 2. More specifically, the VCU 106 may determine if the geolocation 1 and geolocation 2 VTD are within a similarity threshold. Because the geolocation 2 VTD is sufficiently similar to the geolocation 1 VTD (as discussed above with respect to FIG. 2), the VCU 106 may determine that the geolocation 1 configuration profile can be applied to geolocation 2. In this scenario, the VCU 106 may modify the required amount of time that the geolocation 1 configuration profile will apply (e.g., to 6 seconds/2 intervals). The VCU 106 may continue in this fashion and determine that the geolocation 3 VTD is also valid as well as sufficiently similar to the geolocation 1 VTD and again modify the required amount of time that the geolocation 1 configuration profile will apply (e.g., to 9 seconds/3 intervals).

The VCU 106 may then analyze the geolocation 4 VTD, and determine that the geolocation 4 VTD and geolocation 1 VTD are not with the similarity threshold. Thus, the VCU 106 may create a new configuration profile for the geolocation 4 VTD. For example, the VCU 106 may analyze the geolocation 4 VTD, and generate a geolocation 4 configuration profile having instructions to adjust configuration settings including the output power of the power train (and the brake pedal as necessary) so that the vehicle 102 slows to 15 MPH, as well as the steering wheel position so that the vehicle 102 is directed north-west (i.e., turns left) (e.g., based on the steering wheel angle/position and lateral Gs VTD from interval 4). As discussed herein, the VCU 106 may also compare each of one of more components of the geolocation 4 VTD to a corresponding threshold when determining components 101 for which new configuration settings are necessary. For example, the VCU 106 may compare the steering wheel position to a threshold steering wheel position for that particular speed as well as compare the lateral Gs to a threshold amount of lateral Gs to determine whether the vehicle 102 is taking the turn at geolocation 4 too quickly. If so, the VCU 106 may adjust the new configuration setting for the steering wheel (e.g., the angle/position and/or the speed at which the steering wheel changes angle/position) accordingly. The VCU 106 may calculate the required amount of time (or distance) the geolocation 4 configuration profile will apply based on the speed of the vehicle 102 and the position of the steering wheel as well as VTD from a previous geolocation as well as a subsequent geolocation. For example, the VCU 106 may determine the required amount of time the geolocation 4 configuration profile will be active based on the speed of the vehicle 102 and the position of the steering wheel, as well as the speed and direction of the vehicle 102 at geolocations 3 and 5. In some embodiments, the VCU 106 may set the amount of time that the geolocation 4 configuration profile will apply to 1 interval. Analysis of the other components of the geolocation 4 VTD may indicate that no new configuration settings for other components 101 are necessary.

The VCU 106 may then analyze the geolocation 5 VTD and (upon validating the geolocation 5 VTD) may compare the geolocation 5 VTD to the geolocation 4 VTD to determine whether a new configuration profile must be created or if the configuration profile for geolocation 4 can be applied to geolocation 5. The VCU 106 may determine the geolocation 5 and geolocation 4 VTD are not within a similarity threshold and thus that a new configuration profile must be created for the geolocation 5 VTD. The VCU 106 may create a geolocation 5 configuration profile and determine an amount of time the geolocation 5 configuration profile should apply as discussed herein. VCU 106 may then analyze the geolocation 6 VTD and may compare the geolocation 6 VTD to the geolocation 5 VTD to determine whether a new configuration profile must be created or if the configuration profile for geolocation 5 can be applied to geolocation 6. The VCU 106 may determine that the geolocation 6 VTD is similar to the geolocation 5 VTD (as discussed above with respect to FIG. 2), and that the geolocation 5 configuration profile can be applied to geolocation 6. The VCU 106 may make a similar determination with respect to the geolocation 7 VTD. The VCU 106 may analyze the geolocation 8 VTD and generate a new configuration profile in a similar manner as the geolocation 4 VTD.

The VCU 106 may then analyze the geolocation 9 VTD and determine that a new configuration profile is once again necessary. The VCU 106 may generate a geolocation 9 configuration profile having new configuration settings including adjusting the output power of the power train (and the accelerator pedal as necessary) so that the vehicle 102 will travel at 40 MPH and adjust the steering wheel angle/position so that the vehicle 102 is travelling north. The brake pedal position, lateral Gs, and the battery charge components of the geolocation 9 VTD may not indicate that any new configuration settings are necessary for the corresponding components 101. However, the suspension data of the VTD at interval 9 may indicate that road 3 is uneven and/or bumpy. For example, the VCU 106 may compare the distance between the road and the suspension during interval 9 with a corresponding threshold, and determine that the suspension should be softened while travelling through geolocation 9, and generate a new configuration setting for the suspension to soften it. It should be noted that each configuration profile is associated with the direction of the vehicle 102 at the geolocation where the configuration profile was generated.

The above examples are described with respect to an offline model where the vehicle 102 performs all monitoring and processing onboard. Because the vehicle 102 is performing all of the described analysis and monitoring on board (e.g., via the VCU 106), it does not need to rely on a 5G or similar connection with the cloud computing center 104 to perform VTD monitoring and configuration profile generation etc. However, although described above with respect to an offline model, embodiments of the present disclosure may also be implemented an in online model where the processing of VTD and configuration profile generation etc. can be implemented by the cloud computing center 104. In such embodiments, generation of configuration profiles can be based on data from multiple trips from the same driver or different drivers (as the vehicle 102 and the vehicles of other drivers are enabled to exchange VTD online via the cloud computing center 104, which can consolidate several trips from different drivers along the same route). In some embodiments where the vehicle 102 does not upload VTD for route 200 to cloud computing center 104 or analyze it on-board, the VTD for route 200 could be analyzed (and configuration profiles generated) by e.g., the manufacturer whenever the vehicle 102 is e.g., being serviced. Upon generating a set of configuration profiles for route 200, the VCU 106 may store each of the route 200 configuration profiles in entry 107A in memory 107.

When the vehicle 102 begins a subsequent trip on route 200, the VCU 106 may compare the current geolocation and direction of the vehicle 102 with the geolocation and direction associated with each configuration profile. The VCU 106 may activate a particular configuration profile when the current geolocation and direction of the vehicle 102 matches the geolocation and direction associated with that particular configuration profile. In some embodiments, the VCU 106 may activate a configuration profile when the direction of vehicle 102 matches the direction of a particular configuration profile and the current geolocation of the vehicle 102 is within a threshold distance of the geolocation of the particular configuration profile.

In many circumstances, a particular geolocation may have multiple configuration profiles associated with it (e.g., as a result of that geolocation being a part of multiple routes). Thus, if the vehicle 102 is not following guidance from the GPS system 110 (where the route is predetermined), then whenever the vehicle 102 reaches a geolocation (and is travelling in a direction) that is associated with multiple configuration profiles, it must determine which configuration profile to activate. The VCU 106 may determine which of the multiple configuration profiles to use based on the previous configuration profiles applied. In the example of FIGS. 2 and 3, geolocation 8 may be part of multiple routes and may have multiple configuration profiles associated with it. When the vehicle 102 reaches geolocation 8, the VCU 106 may determine that over the course of the route thus far, the route 200 geolocation 1 configuration profile has been applied for 3 intervals, the route 200 geolocation 4 configuration profile has been applied for a single interval, and then the route 200 geolocation 5 configuration profile has been applied for 3 intervals. Thus, the VCU 106 may determine that the vehicle 102 is on route 200 and apply the route 200 geolocation 8 configuration profile. If the VCU 106 is unable to determine which configuration profile to use on this basis, it may refrain from activating any configuration profile. In some embodiments, the VCU 106 may inform the driver (e.g., via audio alert or display interface message) that no configuration profile is being applied for the upcoming geolocation.

In some embodiments, the VCU 106 may generate separate activation rules which may be used to activate configuration profiles. Activation rules may be used for configuration profiles that are to be activated in certain situations and may specify conditions that must be met or events that must occur before a configuration profile is to be activated. In some embodiments, activation rules may also specify conditions that, if met, will prevent activation of configuration profiles. An activation rule may comprise a number of configuration profiles to be activated, a corresponding geolocation and direction for each configuration profile to be activated, and for each of the configuration profiles of the activation rule, one or more parameters dictating whether the configuration profiles should be activated. The geolocation may be "anywhere," or a combination of a geolocation and a radius for which the activation rule is effective. The parameters may include conditions that must be met or events that must occur in order for a configuration profile(s) to be activated, or conditions/events that if met/occur, will prevent activation of the configuration profile(s). For example, an activation rule parameter may specify that a configuration profile is only to be activated if the vehicle 102 is driving slower than 60 MPH, that a configuration profile is only to be activated if the outside temperature is above 70 degrees Fahrenheit, or that a configuration profile is only to be activated if it is not raining.

In another example, a vehicle may be driving on a winding mountain road, and a configuration profile for that geolocation may set the power output of the motor(s) to 100%. Examples of activation rule conditions that may be generated and applied to the configuration profile may include: a condition indicating that the configuration profile is only to be activated if it is dry, since it would be dangerous to allow the motor to have full power output on a winding road when it is raining; a condition indicating that that the configuration profile is only to be activated if the battery is above a certain charge percentage (e.g., 30%) since the battery may be depleted faster by allowing full power output; a condition indicating that the configuration profile is not to be activated if the driver has set the vehicle to a "quiet" driving mode which does not require the full power output.

In some embodiments, upon determining (e.g., via GPS system 110) that the vehicle 102 is embarking on a trip along a particular route, the VCU 106 may preload the configuration profiles associated with the known geolocations on that particular route ahead of time. In some embodiments where generation and storage of configuration profiles is performed by the cloud computing center 104 ("online embodiments"), the vehicle 102 may receive configuration profiles remotely from the cloud computing center 104 based on its current direction and geolocation which is continuously updated online. For example, the vehicle 102 may send its current direction and geolocation to the cloud computing center 104, which may send the vehicle 102 a corresponding configuration profile for an upcoming geolocation. In online embodiments, the vehicle 102 may share VTD in real-time so that other vehicles can change their dynamics as necessary. For example, after a heavy rainfall the road in a certain area may have become slick, thereby providing limited traction. Upon determining this, the vehicle 102 may use the VTD collected at the certain area to modify its configuration profile for that area as well as share the VTD with other vehicles via cloud computing center 104 so that they may also adjust their corresponding configuration profiles as necessary.

In some embodiments, a manufacturer can generate default configuration profiles which are always available to drivers, without the need to analyze collected VTD. The vehicle 102 can be pre-configured with these default configuration profiles to change dynamics before any data is collected. Embodiments of the present disclosure also allow drivers to modify these default configuration profiles (e.g., the configuration settings changes or the extent to which certain configuration settings are changed). In addition, configuration profiles can be edited after they have been deployed, either remotely or during service, and either by the manufacturer or the driver. Drivers can also selectively enable/disable certain configuration profiles manually before or after activation. In some embodiments, the default configuration profiles can be sent to the vehicle 102 as e.g., push updates by the manufacturer or other third-parties without the need for a driver to actually drive the relevant route multiple times (or at all).

In some embodiments, the VCU 106 may group activation rules and/or configuration profiles together and enable/disable groups of activation rules and/or configuration profiles at once. In addition, the driver can selectively enable/disable a set of certain configuration profiles and/or activation rules manually at the same time, for instance based on a selected driving mode. In other embodiments, the VCU 106 may create different configuration profiles and/or activation rules for different vehicles and/or different drivers (depending on their driving style) based on collected VTD. For example, the manufacturer could determine "driving styles" and push certain configuration profiles and/or activation rules to drivers selectively who exhibit the same driving style(s), either online or offline (e.g., during vehicle service).

In some embodiments, the driver may start recording VTD for instance by pressing a button in the cockpit of the vehicle 102 or through a menu of the onboard infotainment system of the vehicle 102 (including e.g., through voice command), causing the VCU 106 to collect VTD as discussed herein. The driver may also stop recording VTD in the same manner. Once a manually initiated recording is finished, the vehicle 102 may store the collected VTD as discussed herein.

Figure 1C:
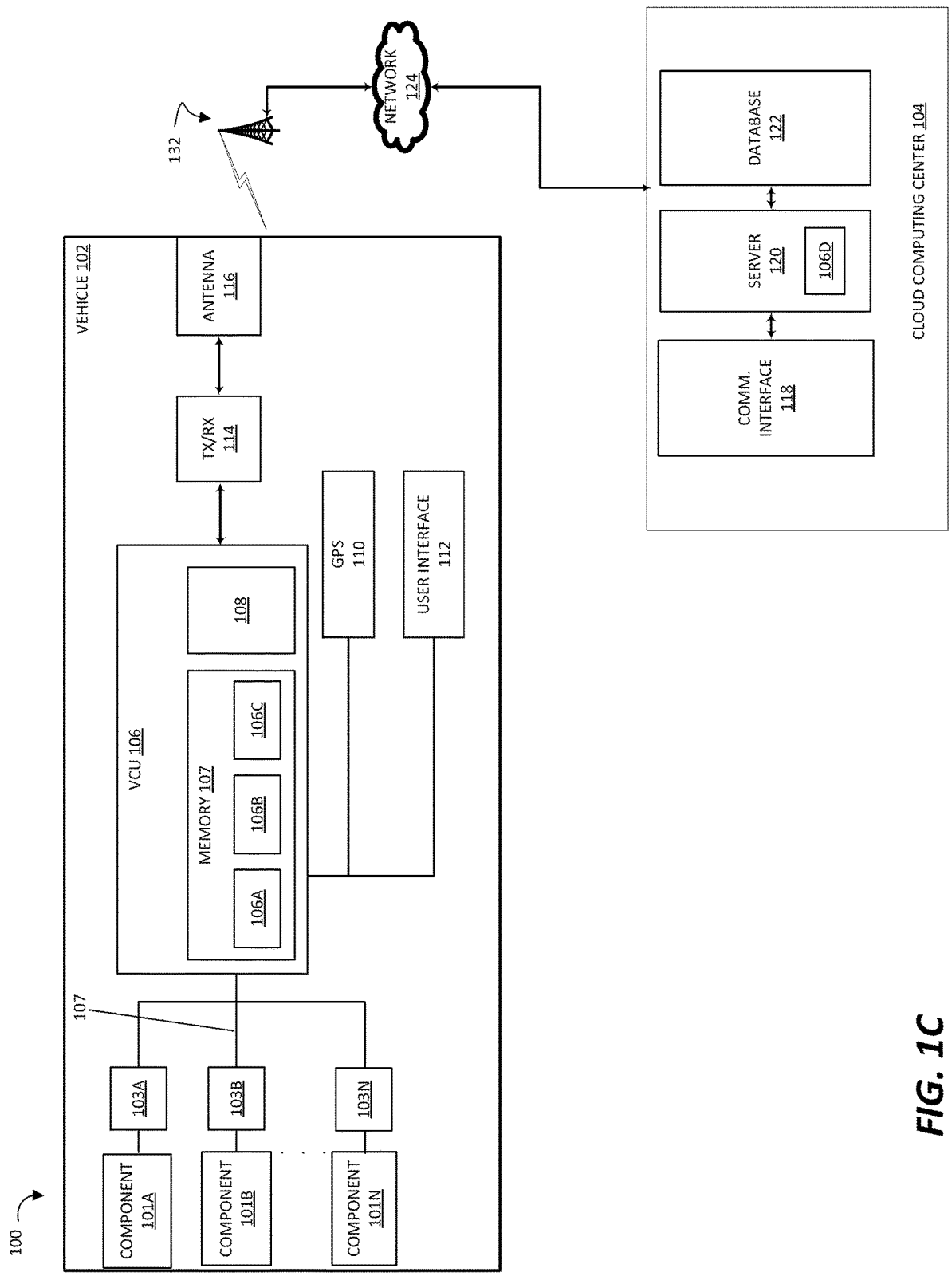
FIG. 1C is a block diagram of a system, in accordance with some embodiments of the present disclosure.

In some embodiments, the VCU 106 may include (within memory 107) a VTD comparison module 106C (as shown in FIG. 1C) which may allow the VCU 106 to, via e.g., the on-board infotainment system (not shown) of the vehicle, provide a graphical user interface (GUI) via which the driver may access their recently recorded VTD for one or multiple routes and compare it to the VTD recorded during previous and subsequent trips on those routes. The VCU 106 may display (via the on-board infotainment system) side-by-side comparisons of VTD from different instances of the trip while showing other collected statistics for the trip.

In some embodiments, the VCU 106 may upload and store VTD collected during various different trips to cloud computing center 104 (or any appropriate online server), in addition to or alternatively to storing the VTD collected during various different trips locally. The cloud computing center 104 may include VTD comparison module 106D (which may be a local version of VTD comparison module 106C) which may provide an online portal where the driver of vehicle 102 may upload their VTD. When the VCU 106 uploads and stores VTD of the vehicle 102 to the cloud computing center 104, the drivers of other vehicles may be able to access the stored VTD and compare their VTD to the VTD of vehicle 102 across trips on the same route. The VCU 106 may allow the driver of vehicle 102 to make their VTD public, or select individual users or groups of users with whom their VTD across trips is to be shared when uploading to the cloud computing center 104.

Similarly, the VCU 106 (executing the VTD comparison module 106C) may interface with the cloud computing center 104 (executing the VTD comparison module 106D) and enable the driver of vehicle 102 to access the VTD of other drivers and compare the VTD (or certain components thereof) of vehicle 102 to the VTD of other vehicles/drivers across trips on the same route. The cloud computing center 104 may enable drivers to compare their timing and performance (based on e.g., any number of appropriate components of the VTD) across trips on the same route. In some embodiments, instead of viewing and comparing VTD using an on-board infotainment system of the vehicle, the VTD comparison module 106C may be implemented as an application on a mobile computing device such as a smart phone. The mobile computing device (executing the VTD comparison module 106C) may interface with the cloud computing center 104 and enable the driver of vehicle 102 to access the VTD of other drivers and compare the VTD of vehicle 102 to the VTD of other vehicles/drivers across trips on the same route using a GUI displayed on the mobile computing device itself.

In another embodiment, the driver can, by pressing a button in the cockpit of the vehicle 102 or through a menu of the onboard infotainment system of the vehicle 102, record an intermediate split (or checkpoint). The vehicle 102 could be configured to automatically add intermediate splits to the recording by using a standard time-elapsed value since the recording started or a predetermined driven distance.

In some embodiments, the driver of vehicle 102 may notify (via VCU 106—executing the VTD comparison module 106C and cloud computing center 104) one or more other vehicles prior to driving a previous route or recording a new route, and if those one or more other vehicles accept the notification, the VCU 106 may transmit VTD recorded during the vehicle 102's trip in real time to those one or more other vehicles. Vehicles may exchange information through an online Internet service or via a vehicle-to-vehicle communication infrastructure such as Vehicular Ad hoc Networks (VANETs) which may use, among other protocols, the IEEE 802.11p protocol for communicating. In another example, vehicles may use the Global System for Mobile communication (GSM) infrastructure for vehicle-to-vehicle communication.

In some embodiments, the VCU 106 may start recording VTD as discussed herein automatically, as soon as it detects that the current geolocation of the vehicle 102 matches a geolocation that has been previously identified by the driver or by other drivers as a starting point of a route (if the other drivers who recorded the route and uploaded/stored it online provided the necessary sharing rights).

In some embodiments, the VCU 106 may notify the driver when the geolocation of the vehicle 102 is close to a geolocation that has been previously identified by the driver or by other drivers as a starting point of a route. The VCU 106 may also suggest starting a new recording as and when the vehicle 102 reaches the starting point. Other drivers could be notified about the same information if the other drivers who recorded the route and uploaded/stored it online provided the necessary sharing rights.

In some embodiments, the VCU 106 may determine that the vehicle 102 is driving the same route of a previous trip despite not having crossed the recorded starting point, and may recommend to the driver initiation of a partial recording of VTD for the remainder of the route. Other drivers could be notified about the same information if the other drivers who recorded the route and uploaded/stored it online provided the necessary sharing rights.

In some embodiments, the VCU 106 may upload collected VTD to the cloud computing center 104 at regular intervals while a trip is still in progress, for instance after a predetermined distance driven or a predetermined time span has elapsed (e.g., every mile or every minute). If the VCU 106 fails to upload the VTD at a given time, the data will be stored locally until an attempt to upload is successful.

In some embodiments, the VTD of various routes the driver of vehicle 102 has driven may be stored within the cloud computing center 104 as an online profile. The driver of vehicle 102 can access the online profile where their VTD for various routes is stored and change certain components of the VTD such as (but not limited to) trip name, date, and driver name, etc.

Figure 4:
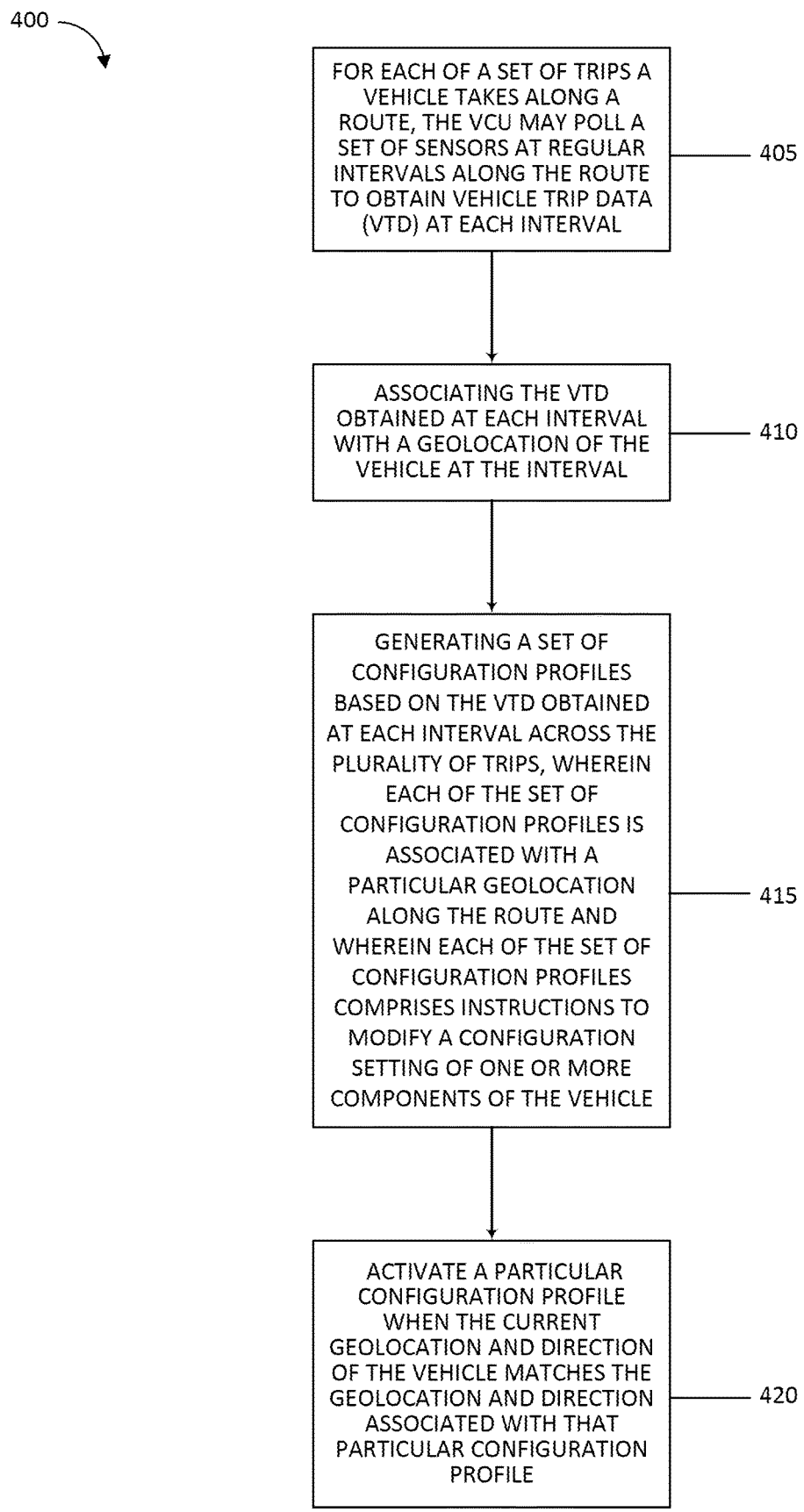
FIG. 4 is a flow diagram of a method for generating configuration profiles based on monitored vehicle trip data, in accordance with some embodiments of the present disclosure.

FIG. 4 is a flow diagram of a method 400 for providing geolocation based control of a vehicle, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., VCU 106 illustrated in FIG. 1A).

Referring also to FIGS. 1A and 2, the method 400 may begin at block 405, where a vehicle 102 may travel to a destination for the first time (i.e., a new destination), and the route may be logged by the GPS system 110 during transit and upon reaching the destination, the VCU 106 may create a new entry in memory 107 (as shown in FIG. 1B) where the new route and any associated VTD may be stored. In some embodiments, the driver may input the new destination into the GPS system 110, which may pre-calculate the route to the destination, and the VCU 106 may store the pre-calculated route in a new entry in memory 107 and update the entry with VTD as it is gathered during the trip. As the vehicle 102 travels towards the new destination, the VCU 106 (executing the trip-specific vehicle dynamics monitoring module 106A) may continuously poll the sensors 103 (or a subset thereof) to collect VTD. At block 410, each time VTD is obtained from the sensors 103 along the route, it may be associated with the geolocation along the route at which it was obtained (determined by the GPS 110) and all VTD collected during the route may be added to the entry in memory 107 for the new route.

The VCU 106 may collect VTD at intervals (time-based or distance-based intervals) and the VTD collection intervals can be dynamically changed by the vehicle 102 under certain circumstances (e.g., if speed is greater than X, then the data collection interval may be doubled). In some embodiments, either the manufacturer and/or driver of the vehicle 102 can change the VTD collection intervals (e.g., manually or remotely). In addition, the vehicle dynamics monitoring module 106A may provide the driver of the vehicle 102 with the ability to specify a subset of the sensors 103 that the VCU 106 will poll when obtaining VTD. The driver may specify a custom subset of sensors 103 to poll, or may select from a number of preset options as discussed in further detail herein. For example, the driver may select a preset option corresponding to a type of vehicle (e.g., electric), which may be associated with a subset of sensors 103 that are relevant for electric vehicles (e.g., a subset that includes battery pack sensors and electric motor output sensors).

Over time, as the vehicle 102 travels the route 200 numerous times (i.e., takes numerous trips on route 200), VTD may be gathered as discussed above with respect to FIG. 2 for each trip on route 200 and stored in the corresponding entry 107A in the memory 107 (shown in FIG. 1B). The VCU 106 may perform this monitoring and gathering of VTD as discussed above for a variety of different routes, each route having a corresponding entry in the memory 107 (shown in FIG. 1B). Once the VCU 106 has gathered VTD for a route a threshold number of times, at block 415 it may execute the configuration profile generation module 106B in order to generate a set of configuration profiles based on the VTD gathered from each trip on the route.

Each configuration profile may comprise a set of instructions for adjusting the configuration settings of one or more components 101 of the vehicle at or near a corresponding geolocation so as to change the vehicle dynamics when the vehicle reaches or approaches the corresponding geolocation. Examples of components 101 that configuration profiles could be applied to may include but are not limited to: the power train(s) (configuration settings for e.g., power output, rotations per time unit, temperature), the chassis, the dynamic engine/motor/battery pack mounts, suspension systems (configuration settings for e.g., stiffness or height of selected/all suspensions), active aerodynamic components (configuration settings for e.g., rear spoiler angle/height, side or rear wing angle, underbody wing angle etc.), battery pack(s) (configuration settings for e.g., current output or temperature), steering wheel (configuration settings for e.g. steering wheel angle, stiffness, reaction time), accelerator and brake pedals (configuration settings for e.g., stiffness, reaction time), gearbox (configuration settings for e.g., shifting time, available gears), and driving mode, among others.

Each configuration profile may be generated based on VTD gathered at the corresponding geolocation along the route 200 and the corresponding geolocation itself. The instructions of a configuration profile may specify the vehicle component(s) 101 for which the configuration settings are going to be changed and the new configuration setting value for each of the specified vehicle component(s) 101. The instructions of a configuration profile may also specify a required amount of time over which the new configuration settings for one or more of the components 101 must be enabled, a spatial distance over which the new configuration settings for one or more of the components 101 must be enabled (e.g., X seconds, X distance, etc.), and/or a set of disabling conditions dictating certain events that must occur or conditions that must be satisfied before the new configuration settings for one or more of the components 101 must be disabled. The disabling conditions may be used in situations where new configuration settings are not meant to be disabled within a particular time or after a certain distance, but upon the occurrence of an event or condition. For example, a disabling condition may specify a particular geolocation which must be reached before certain new configuration settings will be deactivated, and may include a direction that the vehicle 102 must be in upon reaching the particular geolocation before the certain new configuration settings will be deactivated. In another example, a disabling condition may specify that certain new configuration settings will remain active until the next power cycle of the vehicle. For example, the vehicle 102 may repeatedly travel on a route that goes through a city, wherein the power train of the vehicle 102 reduces its output by 50% while it is in the city. Thus, the VCU 106 may generate a configuration profile with new settings for the power train that reduce its output by 50% and may include in the configuration profile a disabling condition indicating that the power train output reduction setting will remain in effect until the vehicle 102 leaves the city or until the next power cycle (e.g., the driver stops and turn the vehicle off). In some scenarios, the disabling conditions may specify conditions under which certain new configuration settings are always to be active.

When determining the vehicle component(s) 101 for which the configuration settings are going to be changed, the new configuration setting value for each of the specified vehicle component(s) 101, and the required time interval or spatial distance over which the new configuration settings for each component 101 must be enabled, the VCU 106 may analyze the VTD collected at the corresponding geolocation for which the configuration profile is being generated. The VCU 106 may determine some of the vehicle component(s) 101 and corresponding configuration settings etc. directly from the VTD as discussed in further detail herein. However, the VCU 106 may also determine other vehicle component(s) 101 and corresponding configuration settings etc. by comparing certain components of the VTD to a corresponding threshold, as discussed in further detail herein.

At block 420, when the vehicle 102 begins a subsequent trip on route 200, the VCU 106 may compare the current geolocation and direction of the vehicle 102 with the geolocation and direction associated with each configuration profile. The VCU 106 may activate a particular configuration profile when the current geolocation and direction of the vehicle 102 matches the geolocation and direction associated with that particular configuration profile. In some embodiments, the VCU 106 may activate a configuration profile when the direction of vehicle 102 matches the direction of a particular configuration profile and the current geolocation of the vehicle 102 is within a threshold distance of the geolocation of the particular configuration profile.

Figure 5:
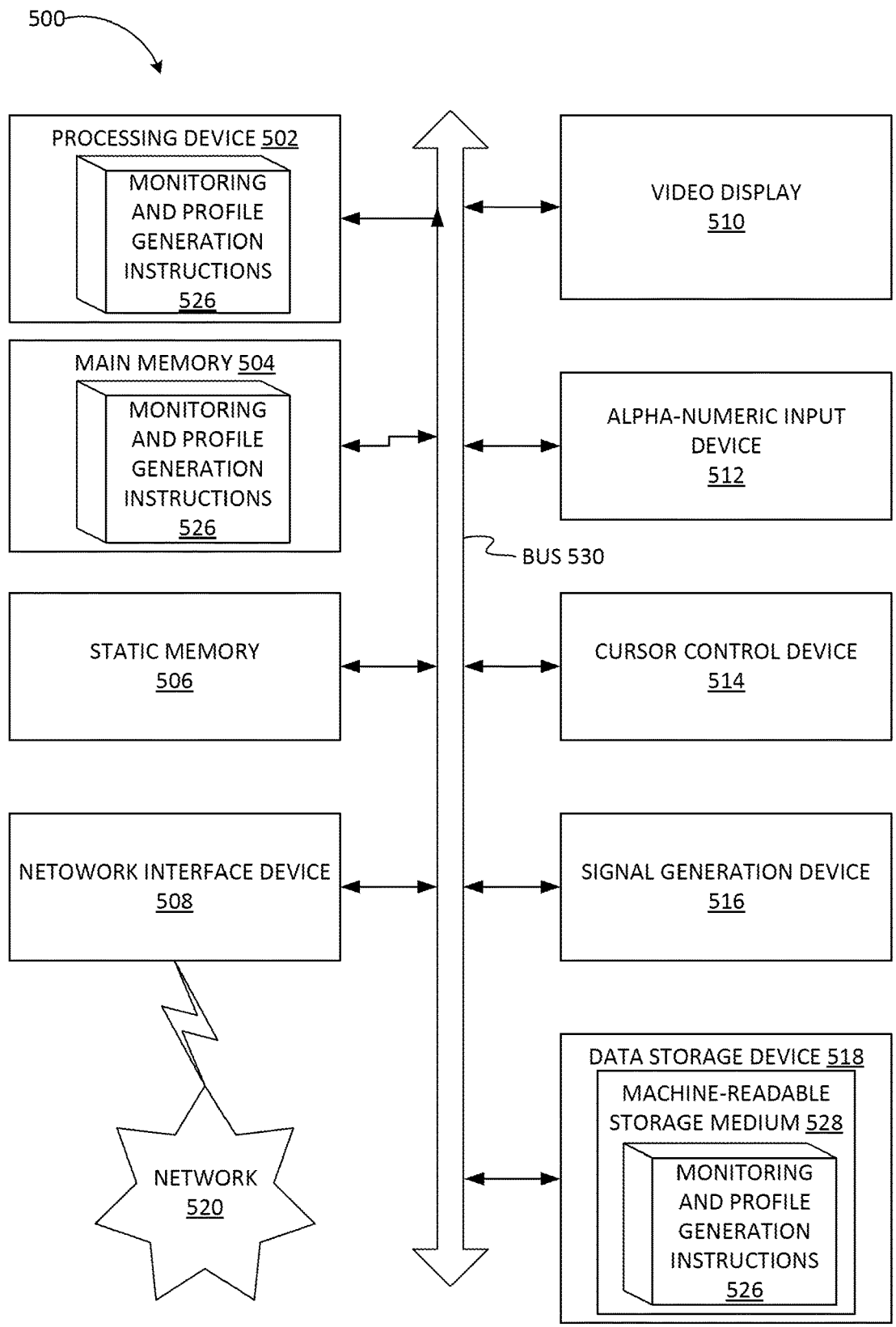
FIG. 5 illustrates a computing device which may perform the functions described herein, in accordance with some embodiments of the present disclosure.

FIG. 5 illustrates a diagrammatic representation of a machine in the example form of a computer system 500 (e.g., the VCU 106) within which a set of instructions, for causing the machine to perform any one or more of the methodologies discussed herein for providing geolocation based control of a vehicle.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute configuration profile generation instructions 526, for performing the operations and steps discussed herein.

The data storage device 518 may include a machine-readable storage medium 528, on which is stored one or more sets of configuration profile generation instructions 526 (e.g., software) embodying any one or more of the methodologies of functions described herein. The configuration profile generation instructions 526 may also reside, completely or at least partially, within the main memory 504 or within the processing device 502 during execution thereof by the computer system 500; the main memory 504 and the processing device 502 also constituting machine-readable storage media. The configuration profile generation instructions 526 may further be transmitted or received over a network 520 via the network interface device 508.

The machine-readable storage medium 528 may also be used to store instructions to perform a method for determining whether to shut down a worker node when communication between the worker node and a control plane is disabled, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
 for each of a set of trips a vehicle takes along a route:
  polling, as the vehicle travels along the route, a set of sensors at regular intervals to obtain vehicle trip data (VTD) at each interval;
  associating the VTD obtained at each interval with a geolocation of the vehicle at the interval; and
 for one or more geolocations of the vehicle along the route, generating and storing a corresponding configuration profile based at least in part on the VTD associated with the geolocation across the set of trips to generate a set of configuration profiles, wherein each of the set of configuration profiles comprises instructions to modify a configuration setting of one or more components of the vehicle when the vehicle is within a threshold distance of the corresponding geolocation; and
 during a subsequent trip along the route, operating the vehicle based on one or more of the set of configuration profiles.

2. The method of claim 1, further comprising:
 generating a set of activation rules, wherein each of the set of activation rules comprises:
  a subset of the set of configuration profiles;
  a corresponding geolocation of each of the subset of configuration profiles; and
  for each of the subset of configuration profiles, a corresponding set of conditions which must be met in order for the configuration profile to be activated, and wherein operating the vehicle based on the one or more configuration profiles comprises:
   in response to the vehicle approaching a geolocation corresponding to a particular configuration profile of a particular activation rule of the set of activation rules, using the set of conditions corresponding to the particular configuration profile to determine whether the particular configuration profile should be activated.

3. The method of claim 1, wherein for each of the set of configuration profiles, the instructions to modify a configuration setting of one or more components of the vehicle comprises one or more of:
 an identification of the one or more components of the vehicle;
 a new configuration setting for each of the one or more components of the vehicle; and
 a time period over which the new configuration setting for each of the one or more components of the vehicle is to be active, a spatial distance over which the new configuration setting for each of the one or more components of the vehicle is to be active, or one or more conditions which must be met before the new configuration setting for each of the one or more components of the vehicle will be deactivated.

4. The method of claim 1, wherein generating a particular configuration profile of the set of configuration profiles comprises:
 identifying one or more of the set of components of the vehicle and a corresponding new configuration setting for each of the one or more of the set of components based on VTD obtained from a geolocation corresponding to the particular configuration profile; and
 determining, based on the VTD obtained from the geolocation corresponding to the particular configuration profile, a required time period over which the new configuration setting for each of the identified one or more components of the vehicle is to be active, a spatial distance over which the new configuration setting for each of the identified one or more components of the vehicle is to be active, or one or more conditions which must be met before the new configuration setting for each of the identified one or more components of the vehicle will be deactivated.

5. The method of claim 4, wherein identifying the one or more components of the vehicle and a corresponding new configuration setting for each of the one or more components comprises:
 comparing one or more aspects of the VTD obtained from the geolocation corresponding to the particular configuration profile to a corresponding threshold to identify the one or more components of the vehicle and a corresponding new configuration setting for each of the one or more components.

6. The method of claim 2, wherein the corresponding configuration profile for each of the one or more geolocations of the vehicle along the route is generated based additionally on VTD associated with the geolocation from a plurality of trips taken by other vehicles along the route.

7. The method of claim 2, further comprising:
 accessing a cloud storage to access the VTD associated with the geolocation from the plurality of trips taken by other vehicles along the route.

8. The method of claim 2, further comprising:
 receiving a second set of configuration profiles as part of a push update, wherein each of the second set of configuration profiles comprises instructions to modify a configuration setting of one or more components of the vehicle.

9. The method of claim 1, further comprising:
 for each of the one or more geolocations of the vehicle along the route, determining whether the VTD associated with the geolocation for each of the set of trips are sufficiently similar based on a consistency threshold.

10. The method of claim 1, wherein the set of trips corresponds to a threshold number of trips.

11. A system comprising:
 a memory; and
 a processing device operatively coupled to the memory, the processing device to:
  for each of a set of trips a vehicle takes along a route:
   poll, as the vehicle travels along the route, a set of sensors at regular intervals to obtain vehicle trip data (VTD) at each interval;
   associate the VTD obtained at each interval with a geolocation of the vehicle at the interval; and
  for one or more geolocations of the vehicle along the route, generate and store a corresponding configuration profile based at least in part on the VTD associated with the geolocation across the set of trips to generate a set of configuration profiles, wherein each of the set of configuration profiles comprises instructions to modify a configuration setting of one or more components of the vehicle when the vehicle is within a threshold distance of the corresponding geolocation; and
  during a subsequent trip along the route, operate the vehicle based on one or more of the set of configuration profiles.

12. The system of claim 11, wherein the processing device is further to:
generate a set of activation rules, wherein each of the set of activation rules comprises:
a subset of the set of configuration profiles;
a corresponding geolocation of each of the subset of configuration profiles; and
for each of the subset of configuration profiles, a corresponding set of conditions which must be met in order for the configuration profile to be activated, and wherein to operate the vehicle based on the one or more configuration profiles, the processing device is to:
in response to the vehicle approaching a geolocation corresponding to a particular configuration profile of a particular activation rule of the set of activation rules, use the set of conditions corresponding to the particular configuration profile to determine whether the particular configuration profile should be activated.

13. The system of claim 11, wherein for each of the set of configuration profiles, the instructions to modify a configuration setting of one or more components of the vehicle comprises one or more of:
an identification of the one or more components of the vehicle;
a new configuration setting for each of the one or more components of the vehicle; and
a time period over which the new configuration setting for each of the one or more components of the vehicle is to be active, a spatial distance over which the new configuration setting for each of the one or more components of the vehicle is to be active, or one or more conditions which must be met before the new configuration setting for each of the one or more components of the vehicle will be deactivated.

14. The system of claim 11, wherein to generate a particular configuration profile of the set of configuration profiles, the processing device is to:
identify one or more of the set of components of the vehicle and a corresponding new configuration setting for each of the one or more of the set of components based on VTD obtained from a geolocation corresponding to the particular configuration profile; and
determine, based on the VTD obtained from the geolocation corresponding to the particular configuration profile, a required time period over which the new configuration setting for each of the identified one or more components of the vehicle is to be active, a spatial distance over which the new configuration setting for each of the identified one or more components of the vehicle is to be active, or one or more conditions which must be met before the new configuration setting for each of the identified one or more components of the vehicle will be deactivated.

15. The system of claim 14, wherein to identify the one or more components of the vehicle and a corresponding new configuration setting for each of the one or more components, the processing device is to:
compare one or more aspects of the VTD obtained from the geolocation corresponding to the particular configuration profile to a corresponding threshold to identify the one or more components of the vehicle and a corresponding new configuration setting for each of the one or more components.

16. The system of claim 12, wherein the processing device generates the corresponding configuration profile for each of the one or more geolocations of the vehicle along the route based additionally on VTD associated with the geolocation from a plurality of trips taken by other vehicles along the route.

17. The system of claim 12, wherein the processing device is further to:
access a cloud storage to access the VTD associated with the geolocation from the plurality of trips taken by other vehicles along the route.

18. The system of claim 12, wherein the processing device is further to:
receive a second set of configuration profiles as part of a push update, wherein each of the second set of configuration profiles comprises instructions to modify a configuration setting of one or more components of the vehicle.

19. The system of claim 11, wherein the processing device is further to:
for each of the one or more geolocations of the vehicle along the route, determine whether the VTD associated with the geolocation for each of the set of trips are sufficiently similar based on a consistency threshold.

20. The system of claim 11, wherein the set of trips corresponds to a threshold number of trips.

21. A non-transitory computer-readable medium having instructions stored thereon which, when executed by a processing device, cause the processing device to:
for each of a set of trips a vehicle takes along a route:
poll, as the vehicle travels along the route, a set of sensors at regular intervals to obtain vehicle trip data (VTD) at each interval;
associate the VTD obtained at each interval with a geolocation of the vehicle at the interval; and
for one or more geolocations of the vehicle along the route, generate and store a corresponding configuration profile based at least in part on the VTD associated with the geolocation across the set of trips to generate a set of configuration profiles, wherein each of the set of configuration profiles comprises instructions to modify a configuration setting of one or more components of the vehicle when the vehicle is within a threshold distance of the corresponding geolocation; and
during a subsequent trip along the route, operate the vehicle based on one or more of the set of configuration profiles.

22. The non-transitory computer-readable medium of claim 21, wherein the processing device is further to:
generate a set of activation rules, wherein each of the set of activation rules comprises:
a subset of the set of configuration profiles;
a corresponding geolocation of each of the subset of configuration profiles; and
for each of the subset of configuration profiles, a corresponding set of conditions which must be met in order for the configuration profile to be activated, and wherein to operate the vehicle based on the one or more configuration profiles, the processing device is to:
in response to the vehicle approaching a geolocation corresponding to a particular configuration profile of a particular activation rule, use the set of conditions corresponding to the particular configuration profile to determine whether the particular configuration profile should be activated.

23. The non-transitory computer-readable medium of claim 21, wherein for each of the set of configuration profiles, the instructions to modify a configuration setting of one or more components of the vehicle comprises one or more of:

an identification of the one or more components of the vehicle;

a new configuration setting for each of the one or more components of the vehicle; and a time period over which the new configuration setting for each of the one or more components of the vehicle is to be active, a spatial distance over which the new configuration setting for each of the one or more components of the vehicle is to be active, or one or more conditions which must be met before the new configuration setting for each of the one or more components of the vehicle will be deactivated.

24. The non-transitory computer-readable medium of claim 21, wherein to generate a particular configuration profile of the set of configuration profiles, the processing device is to:

identify one or more of the set of components of the vehicle and a corresponding new configuration setting for each of the one or more of the set of components based on VTD obtained from a geolocation corresponding to the particular configuration profile; and determine, based on the VTD obtained from the geolocation corresponding to the particular configuration profile, a required time period over which the new configuration setting for each of the identified one or more components of the vehicle is to be active, a spatial distance over which the new configuration setting for each of the identified one or more components of the vehicle is to be active, or one or more conditions which must be met before the new configuration setting for each of the identified one or more components of the vehicle will be deactivated.

25. The non-transitory computer-readable medium of claim 24, wherein to identify the one or more components of the vehicle and a corresponding new configuration setting for each of the one or more components, the processing device is to:

compare one or more aspects of the VTD obtained from the geolocation corresponding to the particular configuration profile to a corresponding threshold to identify the one or more components of the vehicle and a corresponding new configuration setting for each of the one or more components.

26. The non-transitory computer-readable medium of claim 22, wherein the processing device generates the corresponding configuration profile for each of the one or more geolocations of the vehicle along the route based additionally on VTD associated with the geolocation from a plurality of trips taken by other vehicles along the route.

27. The non-transitory computer-readable medium of claim 22, wherein the processing device is further to:

access a cloud storage to access the VTD associated with the geolocation from the plurality of trips taken by other vehicles along the route.

28. The non-transitory computer-readable medium of claim 22, wherein the processing device is further to:

receive a second set of configuration profiles as part of a push update, wherein each of the second set of configuration profiles comprises instructions to modify a configuration setting of one or more components of the vehicle.

29. The non-transitory computer-readable medium of claim 21, wherein the processing device is further to:

for each of the one or more geolocations of the vehicle along the route, determine whether the VTD associated with the geolocation for each of the set of trips are sufficiently similar based on a consistency threshold.

30. The non-transitory computer-readable medium of claim 21, wherein the set of trips corresponds to a threshold number of trips.

* * * * *